United States Patent [19]

Newell et al.

[11] Patent Number: 4,827,195
[45] Date of Patent: May 2, 1989

[54] MOTOR CONTROL SYSTEM FOR DIRECTING MULTIPLE DEVICES

[75] Inventors: Darrel E. Newell, Bayport; Mary C. O'Brien, Stillwater, both of Minn.

[73] Assignee: Micro Research, Inc., Bayport, Minn.

[21] Appl. No.: 144,570

[22] Filed: Jan. 13, 1988

[51] Int. Cl.$^4$ .............................................. H02P 7/67
[52] U.S. Cl. ........................................ 318/49; 318/625
[58] Field of Search ............... 318/567, 569, 671, 672, 318/34, 49, 55, 66, 625; 364/137, 172–174

[56] References Cited

U.S. PATENT DOCUMENTS

| | | | |
|---|---|---|---|
| 3,105,927 | 10/1963 | Flatten et al. | 318/567 |
| 3,984,628 | 10/1976 | Sharp | 318/618 |
| 4,233,550 | 11/1980 | Berger | 318/640 |
| 4,706,006 | 11/1987 | Solomon | 318/640 |

Primary Examiner—William M. Shoop, Jr.
Assistant Examiner—David Martin
Attorney, Agent, or Firm—Orrin M. Haugen; Thomas J. Nikolai; Frederick W. Niebuhr

[57] ABSTRACT

A low-cost system for allowing manual or automatic aiming of a plurality of motor-driven devices distributed throughout an area from a common control center location. When in a manual mode, the operator may manipulate a four quadrant touch pad or a joy stick device to develop binary control signals indicative of rotational direction and the on/off state of a motor control chip associated with each of the motors. The control signals are distributed over a master bus and optionally over additional local buses to the appropriate motor control chips. In an automatic mode, the same control signals are generated to produce repetitive sweeping of the motor-driven devices through a predetermined arc.

14 Claims, 4 Drawing Sheets

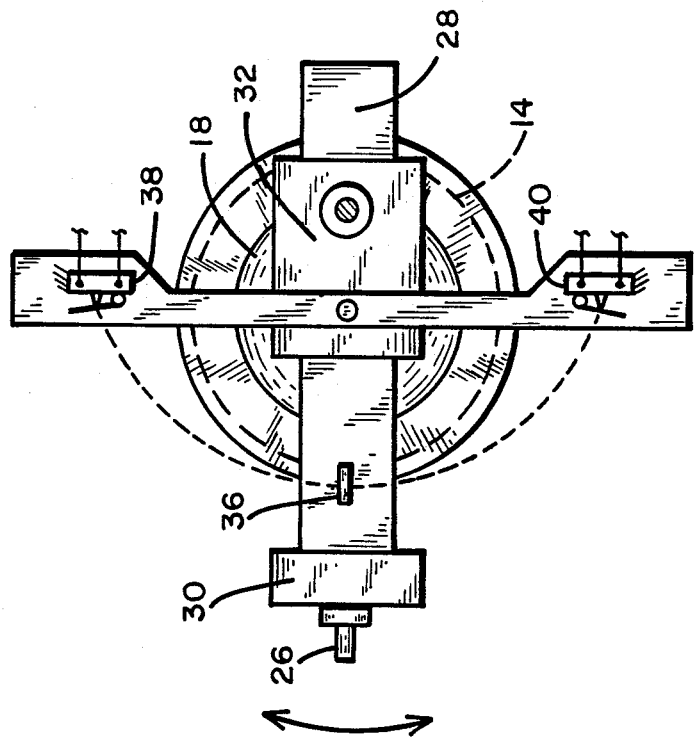
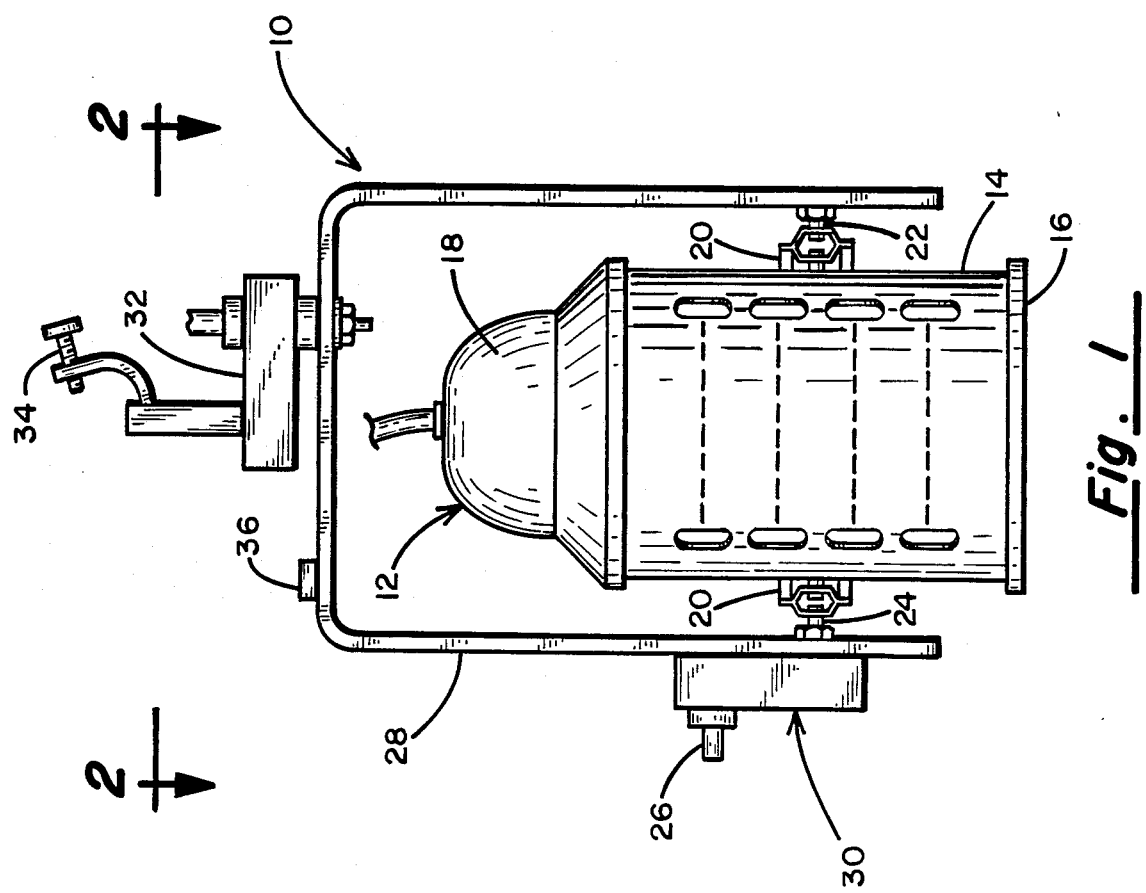
Fig. 2
Fig. 1

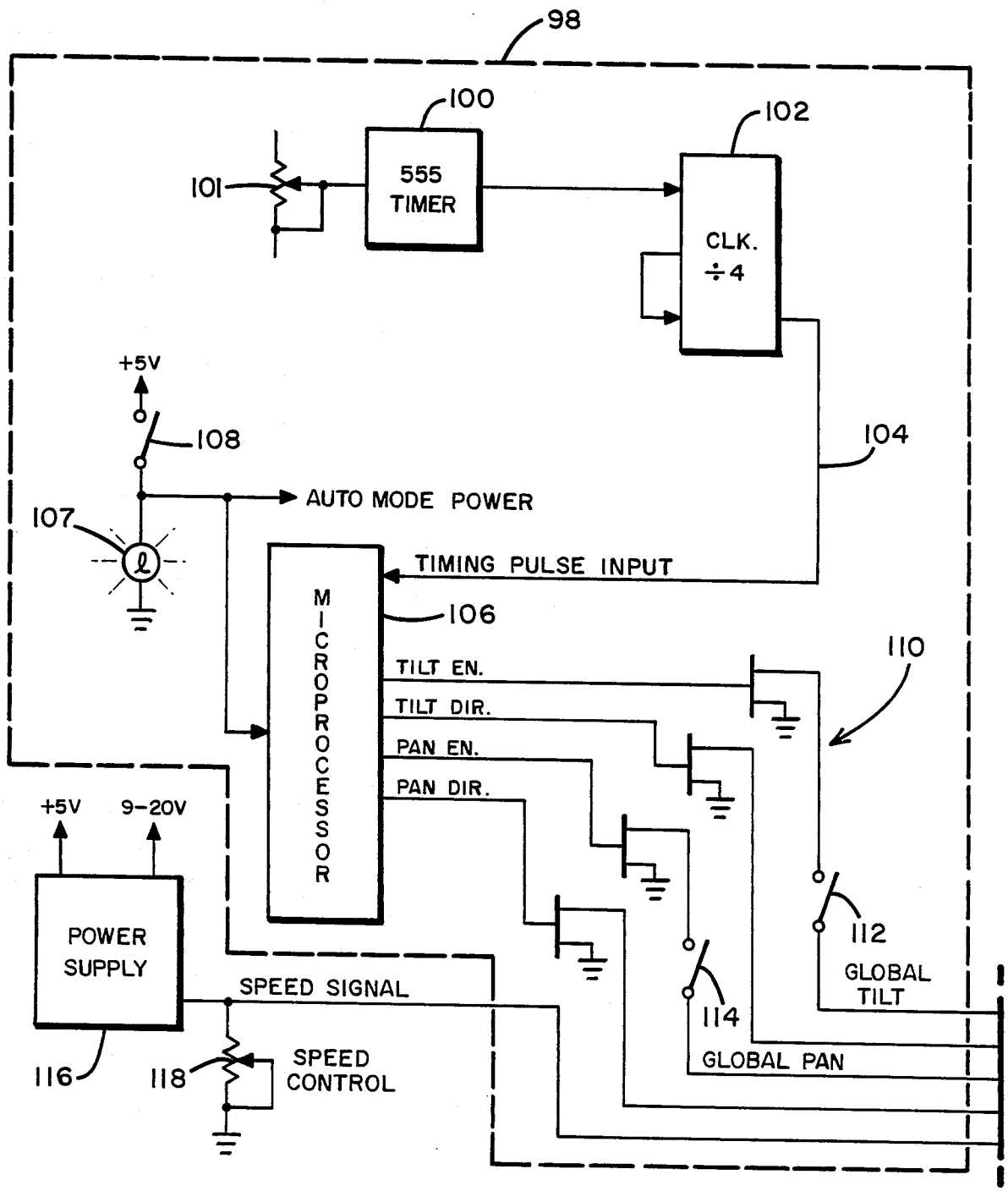

MOTOR CONTROL SYSTEM FOR DIRECTING MULTIPLE DEVICES

BACKGROUND OF THE INVENTION

1. Field of the Invention This invention relates generally to a control system for remotely controlling the operation of plural motors such that devices coupled to the motors can be aimed or otherwise directed.

Discussion of the Prior Art: Described in our earlier U.S. Pat. No. 4,716,344 is a system for controlling a large plurality of stage lights. It includes a microprocessor-based controller coupled to a plurality of satellite modules. Each satellite module also includes its own microprocessor along with plural motor control circuits and encoding means coupled to the motors for providing positional information back to the appropriate microprocessors. The memory of the controller module's microprocessor can be loaded with data to effect movement of any one or more of the lighting instruments in the tilt and pan directions to predetermined preset positions or to sweep out a predetermined pattern of illumination for achieving special effects.

While the system of our earlier patent may be used to effectively control a large plurality of lighting instruments and offers great flexibility in terms of being able to preselect the exact manner in which the lighting instruments are to be directed and the automatic execution of a predetermined motion program, that system tends to be relatively costly and, hence, may be beyond the reach of many entertainment groups or entertainment facilities in which such groups perform. To satisfy the market for a less costly system, we have now devised an arrangement for directing the movement of a plurality of devices from a remote location which, although limited in functional capability, affords the user with the ability to either manually or automatically effect a desire movement and positioning of the devices in the tilt and pan directions.

In particular, the system in accordance with the present invention incorporates a plurality of motors, operating in pairs, to effect movement of a device such as a lighting instrument, a camera, a photographic projector or other related type of equipment so as to point or orient that device in a desired fashion. To accomplish this, associated with each motor pair is a motor control circuit which, upon receipt of appropriate digital inputs indicative of movement direction and enable status, causes energization of the motors and movement of the devices driven thereby. The individual motor control circuits are intercoupled by a local bus which groups a predetermined number of motor control circuits to one another and which allows expansion by daisy-chaining additional local bus assemblies onto a master bus. The master bus is used to distribute the enable and directional control signals originating at either a manually operable touch pad device or, alternatively, at an automatic, electronic control signal generator. By providing appropriate, manually-operable switches between the local bus and its associated motor control circuits and between the touch pad, the automatic control signal generator and the master bus, the operator is provided with a degree of flexibility in selecting which of the plural motors is to be operated and the direction and extent of motor rotation. As such, considerable flexibility is afforded to the low-cost system in terms of being able to design an overall repetitive motion pattern for the devices being controlled.

SUMMARY OF THE INVENTION

The present invention thus provides apparatus for directing the positional orientation of a plurality of devices from a remote location and includes a pair of motors operatively coupled to each of the devices for moving those devices in the tilt and pan directions with motor control means coupled to each of the motors, in pairs, for providing the directional control signals as well as on/off (enable/disable) signals to each of the motors. One or more local bus means and local switch means are also included for selectively distributing binary signals indicative of the directional control signals and the on/off signals to the motor control means associated with predetermined groups of the plural devices. An operator's console, including manually operable means and automatic means for generating the binary signals, is coupled by a master bus means to the local bus whereby the binary signals originating at the operator's console are delivered to the local bus and from there to the motor control means located along that local bus. In addition to the binary signals indicative of direction and the on/off state of the motors, means are provided for generating a motor speed control signal deliverable over the master bus means and the local bus means to all of the motor control circuits included in the system.

Because the gear motors employed to position the device (lamp head) in the tilt and pan directions exhibit an asymmetrical speed characteristic, i.e., they tend to run faster in one direction than in the other, it is desirable that a means be provided for compensating for the asymmetry so that undesired drift in the device aiming will not result when the motors are being operated in their so-called "auto mode". In the preferred embodiment, an inexpensive, readily available microprocessor chip is employed to examine the output of a free-running oscillator which produces square waves having a nominal fifty percent duty cycle. The pulse period is digitized by an on-board timer in the microprocessor to form pulse counts corresponding to each half of the square wave. At this point, the distance traveled by a motor in one direction can be adjusted by subtracting a percentage of the value of the timing counts, thus giving the ability to set the two timing counts at a point where the actual distance traveled during each half of the period of the applied square wave will be equal.

The microprocessor is also employed to ensure that the motors come to a quick stop at the end of its travel and without allowing inertia effects to cause the device to coast. In this regard, the microprocessor computes a brief time interval prior to the end of a given sweep when the motor current should be reversed to aid in stopping.

OBJECTS

It is accordingly a principal object of the present invention to provide an improved, low-cost system for controlling the movement of plural devices, such as lighting instruments employed in an entertainment setting.

Another object of the invention is to provide in such a system the capability of readily expanding the number of devices being controlled.

A further object of the invention is to provide a device positioning system in which a device can be directed along two mutually perpendicular degrees of freedom by either manual manipulation of a directional signal generating device or automatically through the use of a pulse generating source.

Yet still another object of the invention is to provide a motion control system for a plurality of devices in which both the direction and speed of movement are selectable.

A still further object of the invention is to provide a motion control system for a plurality of devices in which means are provided for compensating for the asymmetrical speed characteristics of the gear motors employed.

Yet another object of the invention is to provide a means for arresting motion in one direction in a controlled manner before reversing the direction of movement.

The foregoing objects and advantages of the invention will become apparent to those skilled in the art from the following detailed description of a preferred embodiment of the invention, especially when considered in conjunction with the accompanying drawings.

DESCRIPTION OF THE DRAWINGS

FIG. 1 is a side elevation of a lighting instrument which is representative of a variety of devices whose movement pattern is to be controllable;

FIG. 2 is a top view of the assembly of FIG. 1;

FIGS 3a and 3b when arranged as shown in FIG. 3 comprise an electrical schematic diagram of the control circuitry comprising a preferred embodiment;

DESCRIPTION OF THE PREFERRED EMBODIMENT

Figure 3B:
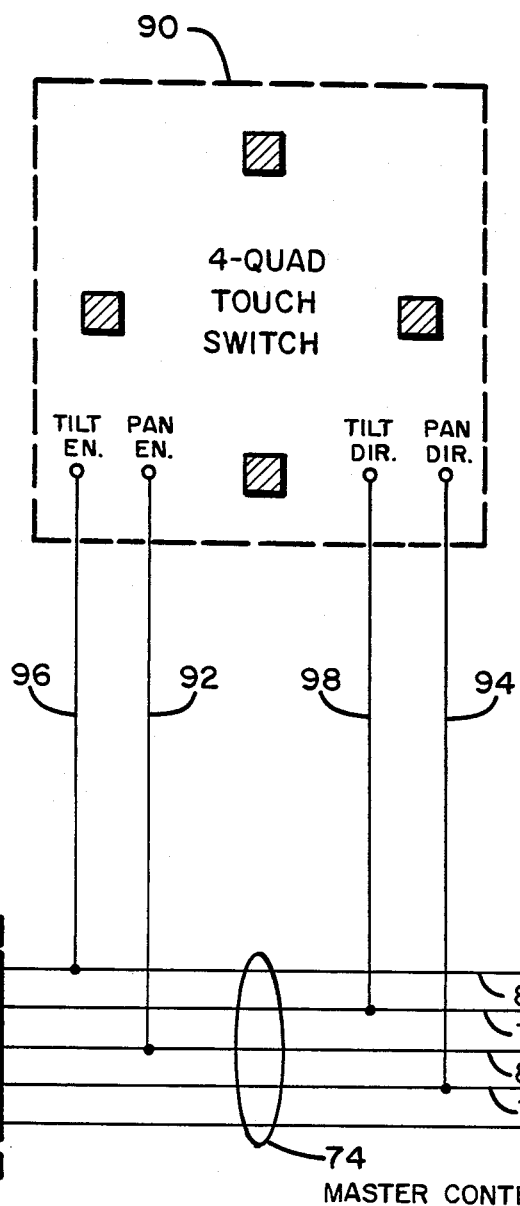

Referring first to FIG. 1, there is indicated generally by numeral lo the mechanical design of a motorized lighting instrument which is illustrated as being representative of a type of device whose positioning is to be controlled. As those skilled in the art will understand, the present invention is not to be limited to application to lighting systems, but is equally applicable to positioning a variety of devices, as already indicated in the introductory portion of this specification.

The lamp, itself, is indicated by numeral 12 and is of a conventional design, including a generally cylindrical canister 14 having an open bottom end 16. Disposed within the canister is an electric lamp (not shown) which is screwed into a ceramic fitting contained within the dome-like end cap 18. The lamp head 12 is pivotally mounted by brackets 20 on shafts 22 and 24, the shaft 24 being driven by a motor 26.

The brackets 20 and their mode of attachment to the lamp head 12 may be identical to that disclosed in the aforereferenced U.S. Pat. No. 4,716,344 and, as such, this structure need not be described in detail herein. Furthermore, as in the system of the aforereferenced patent, the device mounting assembly may include a U-shaped metal bracket 28 to which is attached a motor assembly 30.

The motor assembly 30 is utilized to control movement of the device 12 in the tilt direction. A similar motor arrangement 32 is provided for controlling device movement in the pan direction. The device 12 and its bifurcated support bracket 28 are adapted to be suspended from an appropriate frame member by means of a screw clamp 34.

FIG. 2 shows a plan view of the device assembly of FIG. 1 and, as can be seen, attached to the base of the U-shaped bracket 28 is a projection 36 which is intended to cooperate with one or the other of two Microswitches 38 and 40 which are mounted on an appropriate member so as to be located in the path of travel of the projection 36 as the bracket 28 is rotated by the pan motor 32. Switches 38 and 40 thus establish the limit of movement in the pan direction to approximately 180°. While for ease of explanation and viewing, the switches 38 and 40 are illustrated as exterior to the motor drive assembly 32, in practice, they may be contained within the gear box and actuated by a projection on the driven gear contained within that box.

While not specifically shown in FIGS. 1 and 2, a further pair of Microswitches are appropriately positioned relative to the path of movement of a projection on the driven gear in moving the device 12 in the tilt direction to also function as limit switches for the tilt motor 26.

With reference to FIG. 3b, the device positioning control system is seen to comprise a plurality of motor control chips which may, for example, comprise a Type UDN2993B available through Sprague, Inc. of Worchester, Mass., which comprises a dual H-bridge integrated motor drive circuit. Four such chips are illustrated and are identified by numerals 42, 44, 46 and 48 respectively. Each such chip is arranged to accommodate two independent gear motors such as motors 26 and 32 in FIG. 1. One set of outputs of each chip is labeled pan and the other pair of outputs is labeled tilt, thus indicating the particular motor 32 or 26 being driven by those outputs.

The motor control chips 42 through 48 also have two pairs of input lines, one pair being associated with each of the motors being controlled. In that regard, a first logical input of a predetermined binary state on line 50, 52, 54 and 56 will provide an "enable" to the chip whereas, if the signal is of the opposite binary state, that side of the chip and the motor coupled thereto is disabled. In addition, each of the motor control chips is provided with a pair of input lines (one for each motor) such as input lines 58 and 60 on chip 42. These lines are labeled "direction" or "dir" in that if a first binary signal, e.g., a logical 0 signal is applied, the motor will rotate in a CW direction whereas if that input line is carrying binary "1" signal, the rotation will be in the CCW direction.

The direction input for each of the chips 42 through 48 is connected by a conductor 62 a pole 64 of a double-pole, double-throw manually operable switch 66. Likewise, the direction inputs corresponding to input 60 of chip 42 are joined together by a conductor 68 to the second pole 70 of the double-pole, double-throw switch 66. The respective contacts of the switch 66 are either directly coupled to the pan direction line 72 or to the tilt direction line 76 in a master bus 74 or coupled through an inverter, as at 78 and 80. In this fashion, the switch 66 functions as a direction reversing switch which may be used to shift the sense of the digital control signal actually applied to the motor control chips.

With continued attention to FIG. 3b, it may also be seen that the individual enable inputs for the motor control chips (both pan and tilt) are coupled through single pole-single throw switches as at 82 and 84 for motor control chip 42 to the pan enable line 86 and the tilt enable line 88 in the master control bus 74. The enable input switches 82 and 84 on chip 42, like the corresponding switches on the remaining chips, are ganged together in pairs and, when open, preclude the motors associated with the chip in question to operate, irrespective of the state of the control signals applied to the lines 86 and 88 in the master bus 74.

Each of the chips 42 through 48 also has a further input labeled "9-20 v." As will be explained in greater detail, the speed of rotation of the motors is a function of that voltage, with the motor speed increasing with corresponding increased voltage being applied.

Tilt enable, pan enable, tilt direction and pan direction control signals are applied to the master control bus 74 from two alternative and mutually exclusive sources. The first source is from a four quadrant touch pad which is shown only schematically in FIG. 3b and which is shown as being enclosed by the broken line box, 90. The specific constructional features of this device are described in greater detail in the co-pending application of Darrel E. Newell, Ser. No. 144,550 filed concurrently herewith and entitled "FOUR QUADRANT TOUCH PAD" As is explained in that application, an operator, by appropriate manipulation of his/her hand can cause binary high/low or 1/0 signals to be applied to the master bus 74 over the touch pad output lines 92, 94, 96 and 98.

The system of the present invention can also be made to operate in an automatic or auto mode. The circuitry for producing the requisite pan and tilt enable signals and pan and tilt direction signals is shown as being enclosed by the broken line box 98 in FIG. 3a. It is the function of the auto mode circuitry to permit an automatic repetitive movement of the control devices over a preset length of arc in both the tilt and pan directions.

The auto mode control circuitry is seen to include a Type 555 integrated circuit timer 100 which is configured in a well-known manner as a free-running oscillator for producing a square wave output whose pulse length is adjustable by an appropriate setting of a potentiometer 101. The square wave pulse train produced by the oscillator 100 is applied to the Clk. input of a dual flip-flop integrated circuit chip 102. The chip 102 is configured to function as a divide-by-four device and, as such, produces a square wave output on line 104 having a fifty percent duty cycle. That is, the square wave pulse output is at a first voltage level for a length of time equal to the time that it is at a second voltage level.

The output on line 104 is applied as a timing pulse input to a microprocessor chip 106 which is operational only so long as the switch 108 is closed. When the switch 108 is open, the microprocessor 106 is disabled. The manual mode, four quadrant touch pad 90 is enabled, however.

Figure 3B:
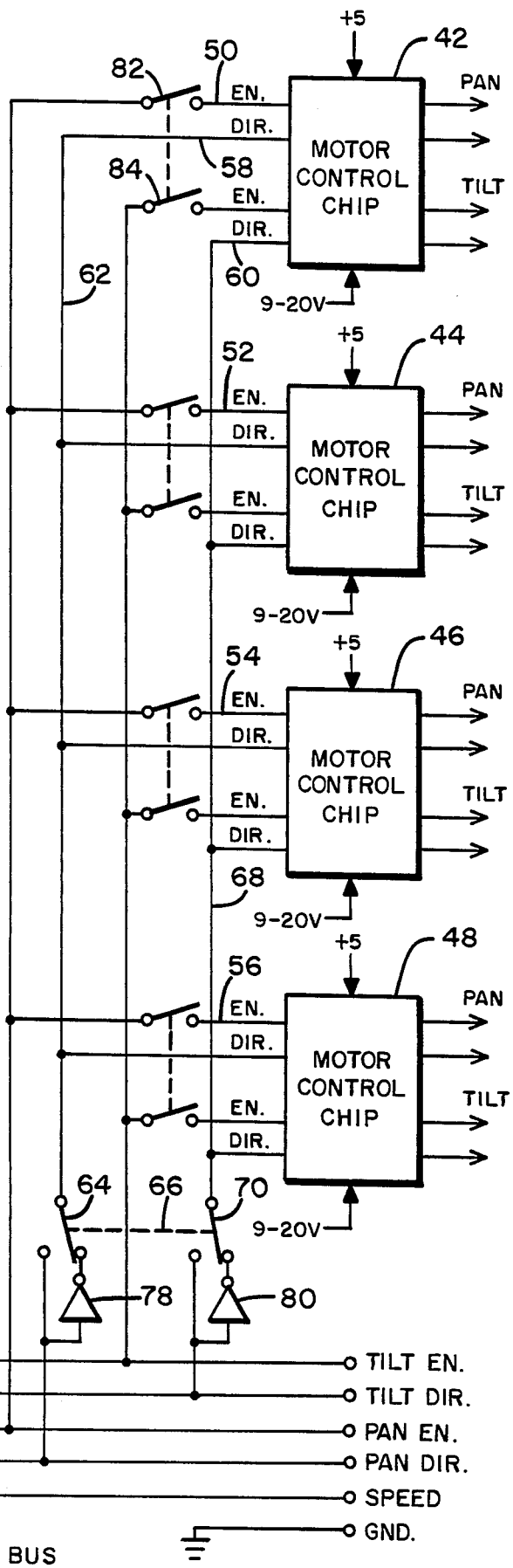

As can be seen from FIG. 3, the microprocessor 106 has four output lines respectively labeled tilt enable, tilt direction, pan enable, and pan direction. These output lines are coupled through VMOS bus drivers indicated generally by numeral 110 to the corresponding lines in the master control bus 74. The tilt enable and pan enable lines are, however, coupled through manually operable single pole-single throw switches labeled 112 and 114.

A power supply 116, preferably including a suitable rectifier and filter network along with a voltage regulator, produces the 5 v. DC potential for the various integrated circuit chips employed in the system and also produces the 9-20 v. speed control signal for the chips 42-48. The lines connecting the speed control inputs to the motor control chips (labelled 9-20 v) from the master bus are left off the drawings of FIGS. 3a and 3b to avoid confusion. The voltage between 9 and 20 volts produced by the power supply 116 is determined by the setting of the speed control potentiometer 118.

Figure 4:
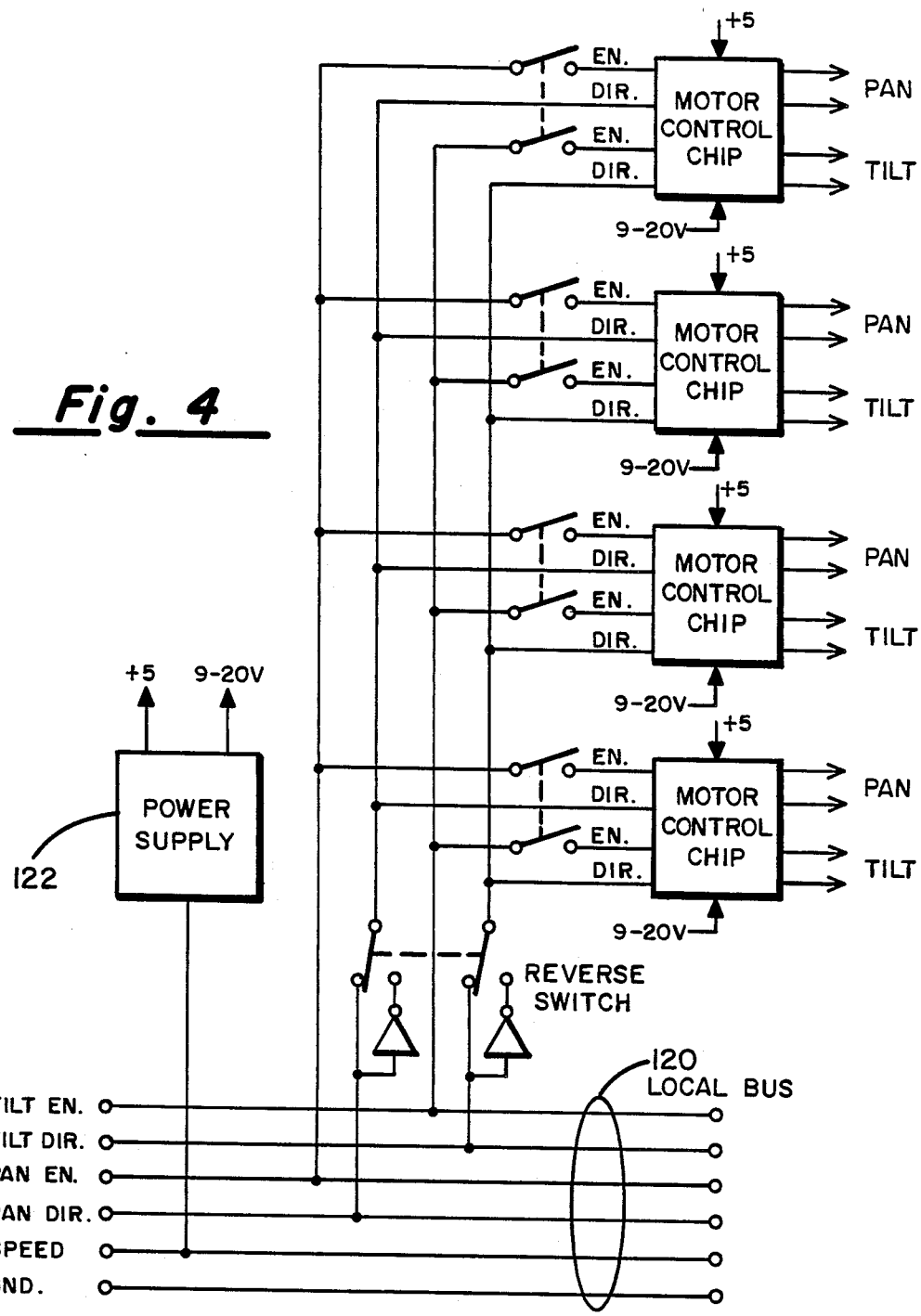
FIG. 4 illustrates the manner in which the system can be expanded to include additional devices.

Before describing the operation of the system, attention is next directed to FIG. 4 to show the manner in which it is possible to daisy-chain additional motor driven devices to the master control bus. Specifically, in FIG. 4 there is shown a local bus identified by numeral 120 which is adapted to be connected by a suitable electrical connector to the corresponding lines in the master bus 74. Additional local bus assemblies, such as in FIG. 4, may be joined to one another to expand the system so as to accommodate still further lighting instruments, cameras or other devices which are to be aimed. Because the manner in which the individual motor control chips illustrated in FIG. 4 are joined to the local bus 120 is substantially identical to the manner in which the motor control chips 42 through 48 in FIG. 3b are joined to the master control bus, it is not deemed necessary to recite again that arrangement of circuit connections. It is to be noted, however, that each of the local buses 120 and the motor control chips utilized therewith has its own power supply, as at 122, for providing the supply potential to the integrated circuit chips on that local bus and for providing the 9-20 v speed control signal to each such chip. Again, for clarity in the drawings, the connections between the line labelled "speed" in the local bus 120 and the 9-20 v speed control inputs of the motor control chips have been omitted. The 9-20 v output from the supply 122 is, however, also governed by the setting of the speed control potentiometer 118 in FIG. 3a and, as such, all motors electrically joined to the master bus either directly or through a local bus are made to operate at the same speed.

Figure 5:
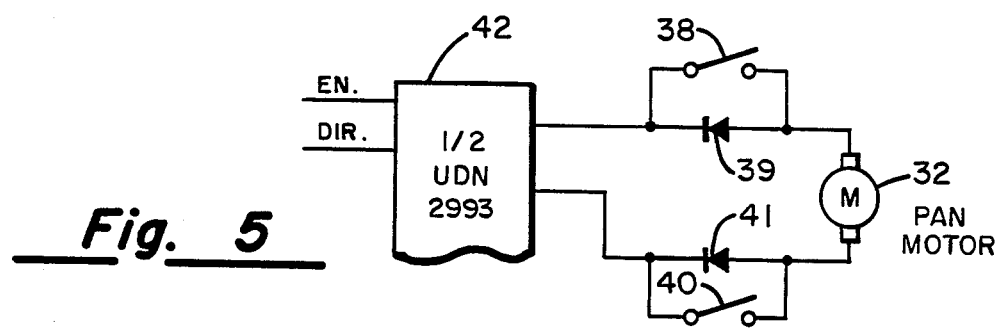
FIG. 5 is a circuit diagram illustrating the motor limit switch arrangement.

FIG. 5 is a schematic diagram showing the manner in which the limit switches 38 and 40 are configured to shut off the pan motor 32. It is to be noted that semiconductor diodes, poled as shown, are connected in parallel with the contacts of the switches 38 and 40 and in series between the motor input terminals and the "pan output" terminals of the motor control chip 42. When the device being moved is somewhere between the 180° stop positions, both switches 38 and 40 will be closed allowing motor current to flow from the motor control chip 42 through the motor 32. When the device has moved to the point where the projection 36 abuts the Microswitch 38, that switch will open and because the diode 39 is reversed biased, it will effectively block the motor control current causing the motor 32 to stop. When the direction signal is subsequently reversed, diode 39 will become forward biased and because the switch 40 will be closed at this time, the motor current may flow, even though switch 38 is momentarily open. As soon as the motor has moved the device to the point where the projection 36 no longer abuts switch 38, switch 38 recloses, shunting the diode 39. The motor will continue to move in the reverse direction (assuming that the enable and direction inputs to the chip 42 remain unchanged) until the projection 36 operates the microswitch 40 to open its contacts. Diode 41 is reverse biased at this time so that when switch 40 opens, motor current ceases to flow.

It can be seen, then, that the circuitry of FIG. 5 provides a means whereby the motors become de-energized upon reaching their end limits, but means are provided for allowing the motor to become energized when the direction current is reversed so that the device is capable of being moved away from its end-stop position.

OPERATION

Now that the details of the mechanical and electrical features of the present invention have been described, consideration will be given to its mode of operation. Assuming that lighting instruments are the devices to be controlled, a plurality of such instruments of the type shown in FIG. 1 are appropriately positioned above the stage by securing them to structural members by means of the clamp arrangement 34. The lighting instruments are preferably added in groups of four by merely coupling additional local bus modules (FIG. 4) to the master bus depicted in FIGS. 3a and 3b.

As those familiar with the motor control chip type UDN2993 will understand, each chip can accommodate two motors and, in this regard, one set of outputs will be used to drive the pan motors 32 while the other pair of output terminals connect to the tilt motors 26. In order for a given motor to operate, it must receive a binary "1" signal on its enable input line along with a binary "1" or "0" signal on its direction input line. The direction that the motor rotates, of course, depends upon whether the latter signal is a "1" or a "0". By providing ganged switches such as 82-84 in the "enable input" lines, the operator has the option of locking out any one or more of the motor pairs associated with a given device, thus precluding it from being moved either automatically or manually.

The double-pole, double-throw reverse switch 66 allows the operator to effectively reverse the binary sense of the direction signals associated with a bank of four motor control chips, by switching into the binary directional signal path the logic inverters 78 and 80, so that, for example, a binary "1" signal generated by either the auto mode circuit 98 or the touch panel 90 that may cause clockwise rotation of all motors associated with control chips 42 through 48 will be inverted to a binary "1" signal which will cause counterclockwise rotation of all of the motors associated with the corresponding motor control chips in the local bus 120 in FIG. 4.

As is explained in the aforereferenced co-pending application, the binary direction signals and the chip enable signals can be manually generated by appropriate manipulation of the four quadrant touch pad shown only schematically in FIG. 3b. These signals, when applied to the master bus 74, will, in turn, be applied to the chips 42 through 48 tied directly to the master bus and through the local bus 120 to the additional groups of motor control chips associated with each such local bus that may be daisy-chained to the master.

By selecting the automatic mode by turning the auto mode switch on, the touch panel 90 is effectively disabled while the auto mode circuitry shown enclosed by broken line box 98 is activated. As already mentioned, it is the overall purpose of the auto mode circuitry to permit automatic repetitive movement of the motor driven devices over a preset length of arc. The length of the sweep or arc may be controlled in two ways. First, by adjusting the arc-size potentiometer 101, the, pulse, length of the output from the free-running oscillator 100 and divide-by-four circuit 104 can be increased or decreased in that it controls the length of time that the direction bit remains in a first state before switching to its opposite state. The length of time that each state persists, of course, establishes the length of arc or travel. Secondly, by adjusting the motor speed control potentiometer 118, the distance traveled in the fixed period of time determined by the arc-size potentiometer 101 can be controlled.

Because, as earlier mentioned, the gear motors used with the devices tend to run at a faster speed in one direction than in the other, it is necessary to provide a means to ensure that this will not result in one device being advanced further in one direction than in the other, resulting in unwanted positional drift. To obviate this problem, the pulse output from the divide-by-four circuit 102 is applied as a timing input to the microprocessor 106. The microprocessor, by means of an internal timer, is made to generate pulses at a predetermined, relatively high (0.5 millisecond) frequency and these pulses are accumulated in a counter during each half cycle of the applied square wave input on line 104. The device can be adjusted at the factory by observing the distance traveled in one direction compared to the other and compensation can be introduced by allowing the microprocessor to subtract a percentage of the value of the timing counts developed during one half cycle of the timing pulse input on line 104. This creates one-half pulse equal to the original pulse of 104 and one-half pulse of a calculated percentage smaller which provides the ability to set the timing counts at a point where the actual distance traveled from a center home position by the motor driven devices is equal.

To prevent the motor-driven devices from coasting beyond their desired end of sweep position due to inertia effects, the microprocessor is also programmed to bring the motors to a controlled stop. This is achieved by computing a predetermined time interval, beginning shortly before the end-of-sweep position is reached, where the directional control signal is reversed in polarity causing the motor currents to also reverse, thus attempting to drive the motors in a direction opposite from that in which inertia tends to move them for a short time before turning the motor off.

The global tilt and global pan switches 112 and 114 allow selection of tilt only, pan only or both tilt and pan simultaneously for all devices employed in the system in that they provide a way of selectively interrupting the enable signals required by the dual H-bridge integrated circuit motor drive chips coupled to the master control bus 74 or the local bus 120.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to equipment details and operating procedures, can he accomplished without departing from the scope of the invention itself.

What is claimed is:

1. Apparatus for directing the positional orientation of a first plurality of devices from a remote location including, in combination:

(a) first and second motor means operatively coupled in pairs to each of said first plurality of devices for moving said devices in the tilt and pan directions;

(b) motor control means responsive to binary control signals and coupled to each of said motors for providing drive current signals to each of said motors in accordance with the state of said binary control signals;

(c) master bus means including switch means for selectively distributing said binary control signals to said motor control means associated with predetermined groups of said first plurality of devices, the binary state of said control signals being indicative of rotational direction and an enable/disable condition; and (d) an operator's console including manually operable means and automatic means for generating said binary control signals on a mutually exclusive basis.

2. The apparatus as in claim 1 and further including: local bus means for coupling binary control signals originating at said operator's console from said master bus to further motor control means associated with a second plurality of devices.

3. The apparatus as in claim 1 and further including binary state inverting means selectively connectable between said master bus means and said motor control means for permitting reversal of the binary state of said binary control signals indicative of rotational direction.

4. The apparatus as in claim 1 wherein said operator's console further includes means for generating a motor speed control voltage and said master bus means and said local bus means include means for distributing said motor speed control voltage to said motor control means.

5. The apparatus as in claim 1 wherein said manually operable means in said operator's console is a four quadrant touch pad.

6. The apparatus as in claim 2 wherein said local bus means further includes a double-pole, single-throw switch for each of said motor control means for selectively applying said enable signals to said motor control means.

7. The apparatus as in claim 1 wherein said automatic means includes means for generating a variable frequency pulse train exhibiting a fifty percent duty cycle.

8. The apparatus as in claim 7 and further including means for converting the period of each half cycle of the pulses in said pulse train to a digital count value and for adjusting switching of the binary state of said direction control signal to offset any asymmetry in the speed characteristics of said motor means.

9. The apparatus as in claim 8 wherein said means for converting and adjusting comprises a programmed microprocessor.

10. The apparatus as in claim 7, wherein said variable frequency pulse comprises said binary signal indicative of said directional control signal.

11. The apparatus as in claim 1 wherein said motor control means comprises a dual H-bridge integrated motor driver circuit.

12. The apparatus as in claim 1 wherein said devices are lighting instruments.

13. The apparatus as in claim 1 wherein said devices are video recording cameras.

14. The apparatus as in claim 1 wherein said devices are photoprojectors.

* * * * *